(12) United States Patent
Taylor

(10) Patent No.: US 6,568,247 B2
(45) Date of Patent: May 27, 2003

(54) BAG TESTING MACHINE

(75) Inventor: Alfred Taylor, Chester Hill (AU)

(73) Assignee: TNA Australia Pty., Limited, Chester Hill (AU)

( * ) Notice: Subject to any disclaimer, the term of this patent is extended or adjusted under 35 U.S.C. 154(b) by 0 days.

(21) Appl. No.: 09/946,154

(22) Filed: Sep. 4, 2001

(65) Prior Publication Data

US 2002/0029617 A1 Mar. 14, 2002

(30) Foreign Application Priority Data

Sep. 11, 2000 (AU) .............................................. PR0030

(51) Int. Cl.⁷ ................................................. G01M 3/34
(52) U.S. Cl. ........................... 73/49.3; 73/40.7; 73/49.2; 73/52
(58) Field of Search ................. 73/49.3, 40.7, 73/49.2, 52

(56) References Cited

U.S. PATENT DOCUMENTS

| | | | | |
|---|---|---|---|---|
| 3,879,987 A | * | 4/1975 | Yasuhiro et al. | 73/37 |
| 4,649,740 A | * | 3/1987 | Franklin | 73/49.3 |
| 4,671,101 A | * | 6/1987 | Franklin | 73/49.3 |
| 5,918,270 A | * | 6/1999 | Heuft | 73/45.4 |

FOREIGN PATENT DOCUMENTS

GB 0540148 A1 * 5/1993 ............ G01M/3/36

* cited by examiner

Primary Examiner—Daniel S. Larkin
Assistant Examiner—André K. Jackson
(74) Attorney, Agent, or Firm—Ladas & Parry

(57) ABSTRACT

A machine 10 to test bags 11 to detect faulty bags 11a. The machine 10 includes a probe assembly 23 including a belt 27 which supports a plurality of probes 31. More particularly the bags 11 are engaged by probe portions 33, with displacement of the probe portions 33 providing data for a CPU controller 24 enabling the detection of faulty bags 11a. Faulty bags 11a are then ejected from the conveyor 13 by bag ejector 21.

11 Claims, 4 Drawing Sheets

BAG TESTING MACHINE

TECHNICAL FIELD

The present invention relates to apparatus to test bags to determine whether the bags are sealed closed. More particularly apparatus to detect leaks in the bags.

BACKGROUND OF THE INVENTION

There is available apparatus for detecting leaks in bags, particularly detecting whether the seals at the ends of the bags and back seal are properly formed.

In the formation of bags, the bag material passes a former which forms the bag material into a tubular configuration. The product is delivered to the interior of the tubular bag material, with lengths then being cut to form discrete bags. Each end of the bag and along the tube seam is sealed. If one of the seals is faulty or the bag has an unintended aperture, product within the bag can deteriorate and/or become contaminated.

In relation to detecting faulty bags, that is bags which have a leak, there is known an apparatus which has a single probe which engages the bag and applies a force thereto. If there is a leak movement of the probe results. This movement then indicates that the bag has a leak. The bag is then subsequently rejected from a supporting conveyor.

The above known apparatus has a number of disadvantages including:

(1) having to align each bag with a respective probe;

(2) the apparatus being only suitable for bags within specific length limits; and (3) the probe giving a false reading if it engages product within the bag.

OBJECT OF THE INVENTION

It is the object of the present invention to overcome or substantially ameliorate at least one of the above disadvantages.

SUMMARY OF THE INVENTION

There is disclosed herein a probe assembly to detect faulty bags on a conveyor transporting the bags from a first location to a second location, said assembly including:

a driven belt member forming a loop, the loop having a length to extend generally parallel to and adjacent said conveyor between said first and second locations, which length is to move generally in unison with said conveyor between said first and second locations;

a plurality of probes supported on the belt member, each probe including a bag engaging portion moveably mounted on the belt member to engage one of the bags so as to be displaced thereby relative to the belt member, the probes being spaced so that each bag is engaged by a plurality of the probe members; and a detector to detect the displacement of the probe members and to generate a signal indicative of the displacement so that profiled data in respect of each bag can be generated to aid in identifying faulty bags.

Preferably said bag engaging portions are mounted on the belt for movement generally perpendicular thereto.

In one embodiment, it is preferable for the probes to be arranged in a single row. In a further preferred form preferably the probes are arranged in a plurality of generally parallel co-extensive rows.

Preferably said detector includes a first and a second detector, the second detector being spaced down stream of the first detector in the direction of movement of the belt member.

Preferably said detector includes a mounting member attached to the belt member, with the bag engaging portion being moveably mounted in its respective mounting member.

Preferably said probe assembly further includes a probe compliance portion to engage the probes to urge the probe engaging portions towards the bags and conveyor.

Preferably the compliance portion is a roller.

There is further disclosed herein a method of detecting bags having a leak, said method including:

engaging each bag with a plurality of probes, with displacement of the probes being determined by the bags, the probes being urged into contact with the bags;

providing signals indicative of the displacement of the probes; and electronically comparing the signals associated with each bag at different times to detect a change in configuration of the bag and therefore determine whether the bag has a leak.

Preferably said method includes moving the bags in a predetermined direction from a first location to a second location, and having the probes moved in unison with the bags when engages therewith.

In the above method, the probes are moved in a direction generally perpendicular to the direction of movement of the bags, when the probes are moving into contact with the bags.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENTS

Figure 1:
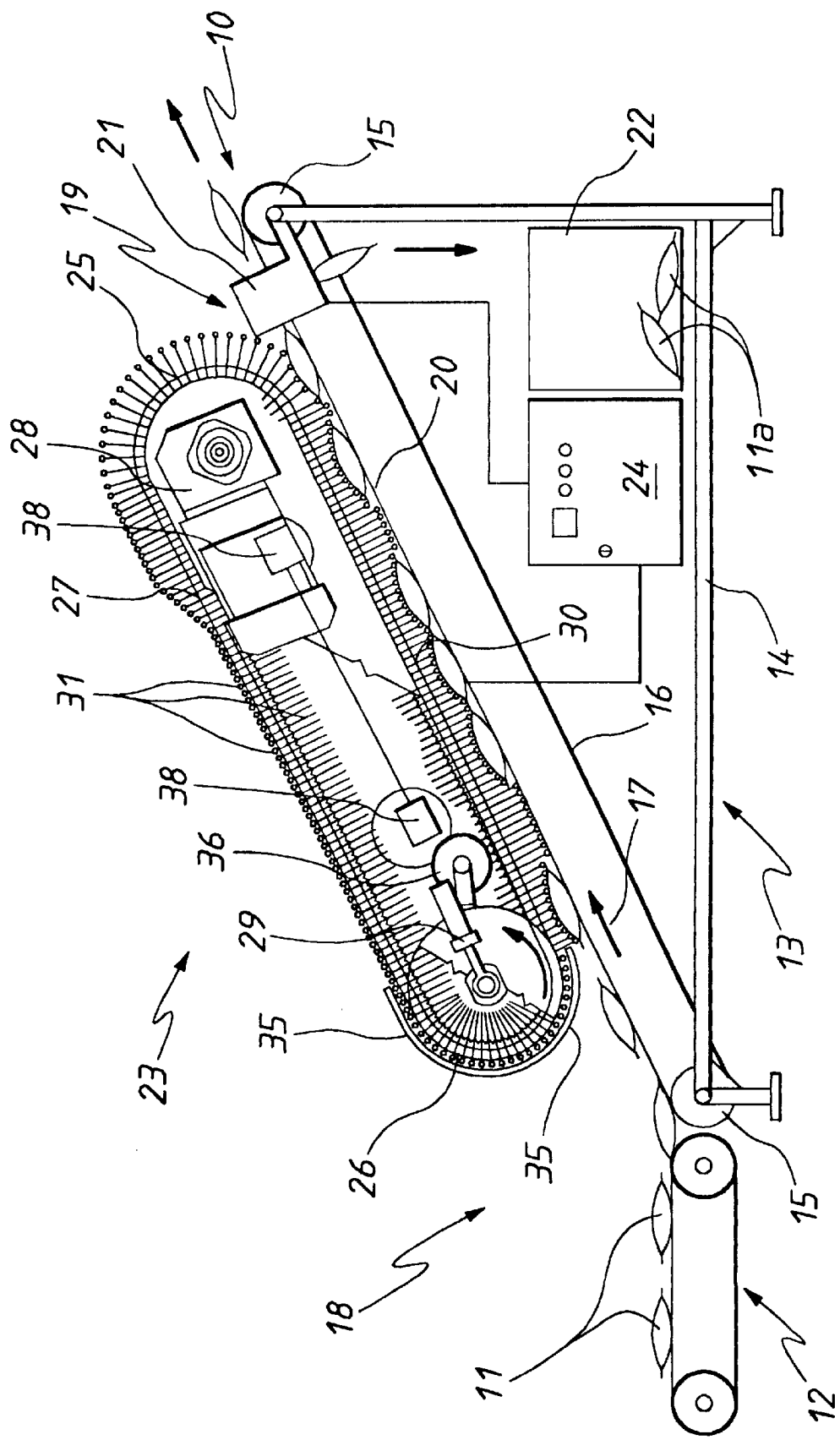
FIG. 1 is a schematic side elevation of a bag testing machine.
Figure 2:
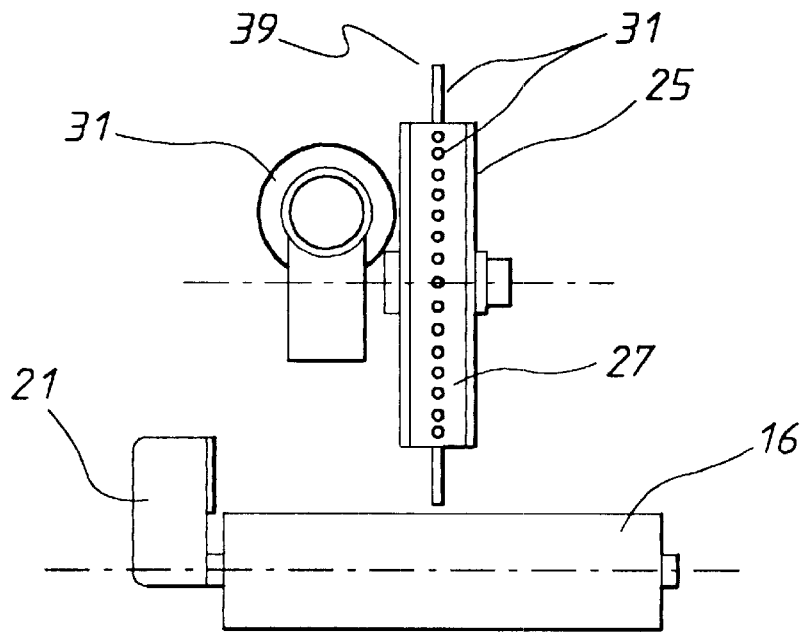
FIG. 2 is a schematic end elevation of a machine of FIG. 1.

In the accompanying drawings there is schematically depicted a machine 10 to test bags 11, in order to detect faulty bags 11a. More particularly the bags 11a would not be properly closed, for example perhaps at least one of the seals at the ends was not properly formed allowing air to escape or enter the bag 11.

The bags 11 arrive on a first conveyor 12 from a packaging machine. The conveyor 12 delivers the bags 11 to a second conveyor 13 which in this embodiment is inclined. The second conveyor 13 includes a base frame 14 supporting rollers 15 of which at least one is driven. Passing between the rollers 15 is a belt 16 which is moved in the direction of the arrow 17. Accordingly the bags 11 are moved from a first location 18 to a second location 19 by the inclined upper belt length 20. At the upper end of the belt length 20 is a bag ejector 21 which is selectively operable to remove the faulty bags 11a from the belt length 20, which bags 11a are delivered via a chute to a container 22.

Associated with the belt length 20 is a probe assembly 23. The assembly 23 tests each bag 11 and provide data for the CPU controller 24. The controller 24 operates the bag ejector 21 so that the faulty bags 11a are ejected.

The assembly 23 includes an upper toothed twin drive wheel 25 which in cooperation with the toothed twin idler wheel 26 drives a toothed belt 27.

The wheel 25 has associated with it a motor drive unit 28 so as to be driven thereby while the wheel 26 has a belt tensioner 29. The belt 27 is driven so that its lower length 30 is driven in the direction of the arrow 17, that is a direction and speed in unison with the belt length 20.

Mounted on the belt 27 is a plurality of probes 31. Each probe 31 includes a mounting member 32 fixed to the belt 27 so as to move therewith. Each member 32 is hollow and telescopically receives a probe portion 33. Each member 32 is fixed and oriented relative to the belt 27 so that the probe portion 33 moves generally normal to the belt 27. In this embodiment the probe portions 33 slideably move through the mounting members 32. Each probe portion 33 has a stop to limit the direction of movement of the probe portion 33 away from the belt 27. Each probe portion 33 also terminates with a hemispherical abutment member 34.

The belt length 30 has the probes 31 oriented so that the probe portions 33 are moveable generally normal to the direction 17 between a first position at which the members 34 are positioned adjacent the belt length 20, and a second position at which the members 34 are retracted back towards the belt length 30, that is when the members 34 are engaged with a bag 11. Each bag 11 is engaged by a plurality of the probe portions 33, so that each probe portion 33 so engage is not permitted to move to the position at which the member 34 is located adjacent the belt 20.

Located adjacent the wheel 27 is a probe retainer 35 which engages the members 34 to retain the probe portions 33 in a retract position ready for release to engage a bag 11. As each probe portion 33 exits from behind the retainer 35, it moves under the influence of gravity towards the belt portion 20. The member 34 will then engage a bag 11 if a bag 11 is positioned adjacent thereto. If there is no bag 11 at the position where the probe portion 33 is released, then the member 34 will move to a position adjacent the belt length 20 but spaced therefrom.

As the probe portions 33 leave the wheel 26, the upper extremities 37 of the probe portion 33 are engaged by a probe compliance roller 36. The roller 36 is moveably mounted and engages the upper extremities 37 of the probe portions 33 to urge them into contact with an associated bag or alternatively to ensure that they are fully extended towards the belt length 20. The roller 36 is mounted so as to be deflected from the position depicted so that probe portions 33 engage with an associate bag deflect the roller 36. The compliance roller 36 is particularly required if the belt length 20 is inclined at a substantial angle.

The testing apparatus 32 further includes at least one laser or acustic distance measurement devices 38 which detects displacement of the probe portion 33. The devices 38 generate signals indicative of the displacement of the probe portions 33, which signals are delivered to the controller 24.

Figure 5:
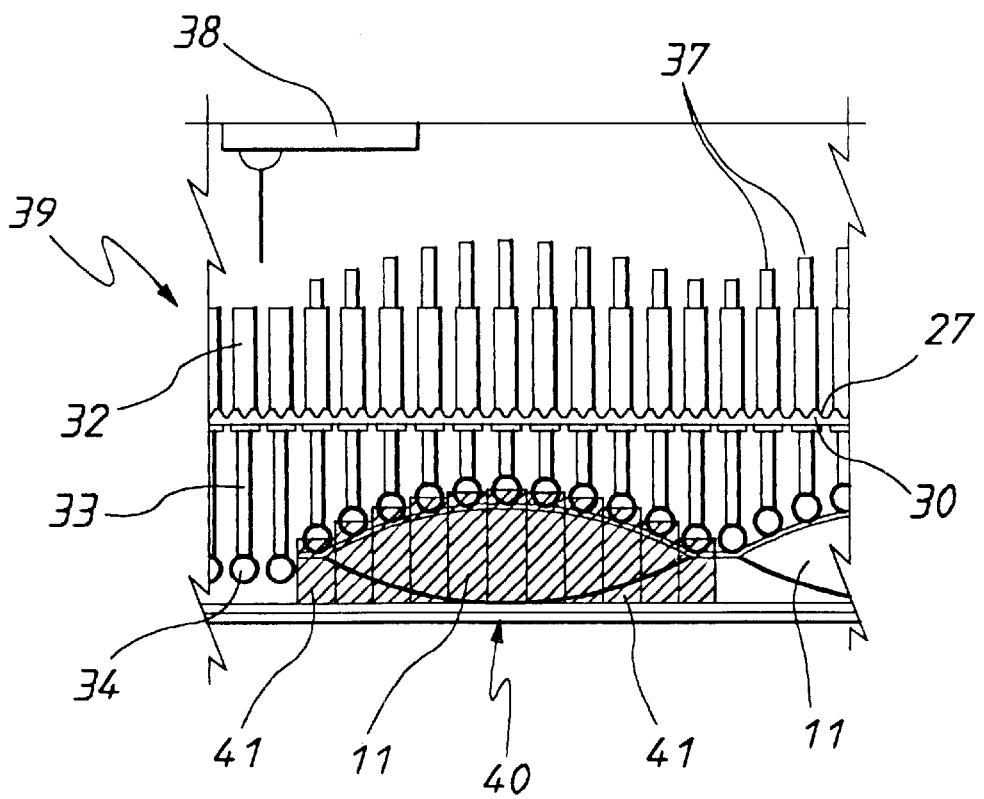
FIG. 5 is a schematic graph associated with the machine portion of FIG. 4.

In the embodiment of FIGS. 1, 2, 4 and 5 the probes 31 are arranged in a single row 39. In this embodiment the control software of the controller 24 uses the input signals from both devises 38 to construct a before and after profile view of each bag 11. These before and after views are used to establish whether the bag 11 being examined leaks. Once detected a bag 11a is ejected to the container 22. The shaded area 40 of FIG. 5 is a schematic software generated view of the associated bag 11. That is each probe 31 provides via the devices 38 a signal indicative of the associated shaded portion 41, which shaded portions 41 make up the area 40.

Figure 3:
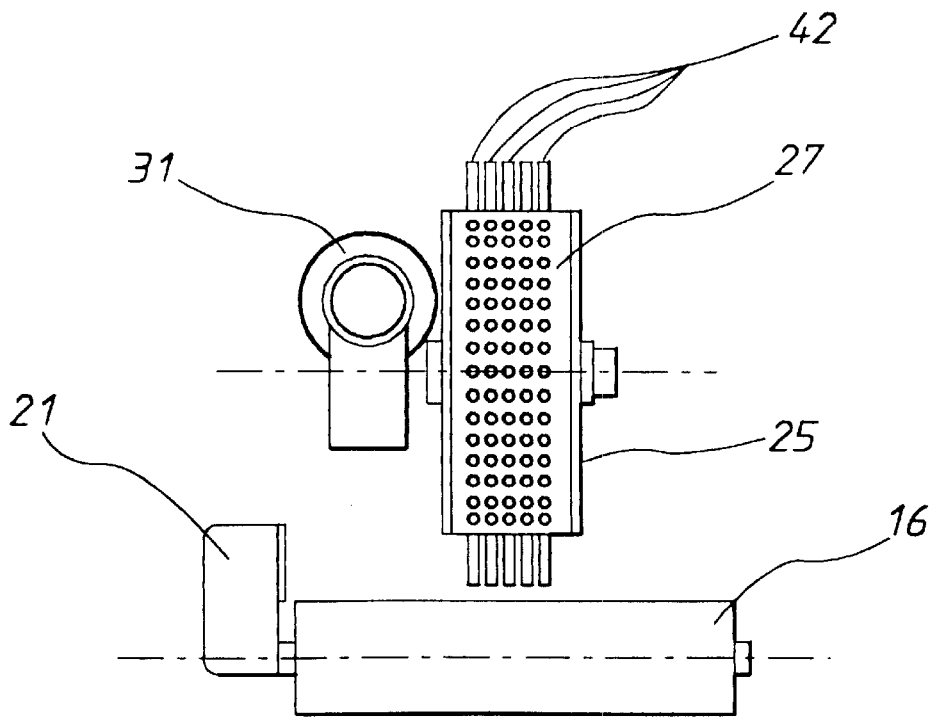
FIG. 3 is a schematic end elevation of a modification of the machine of FIG. 1.
Figure 4:
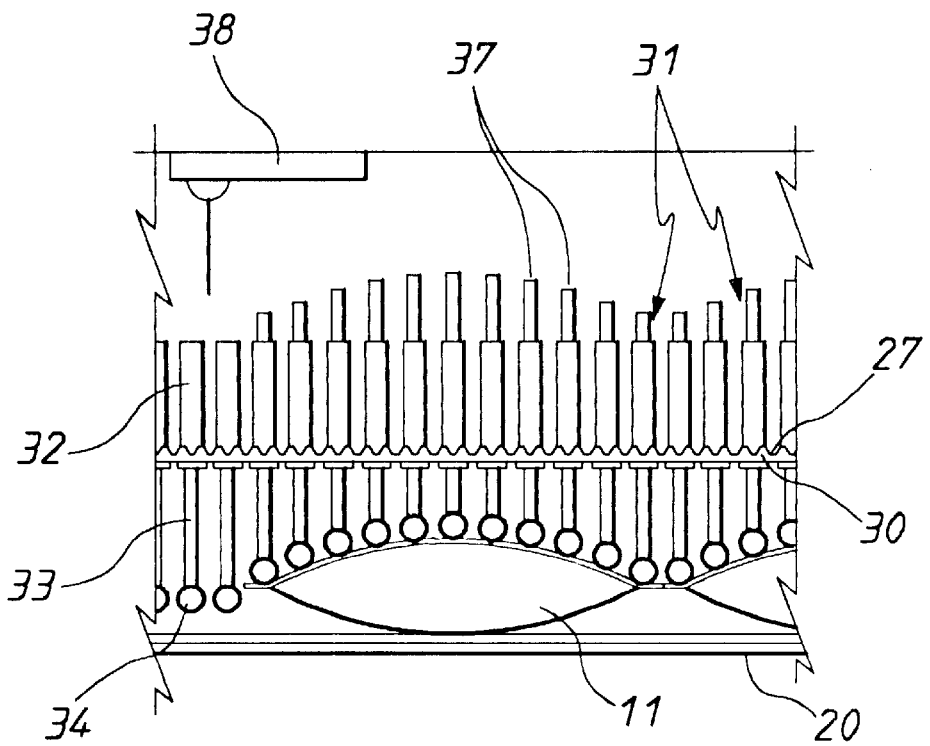
FIG. 4 is a schematic side elevation of a portion of the machine of FIG. 1.
Figure 6:
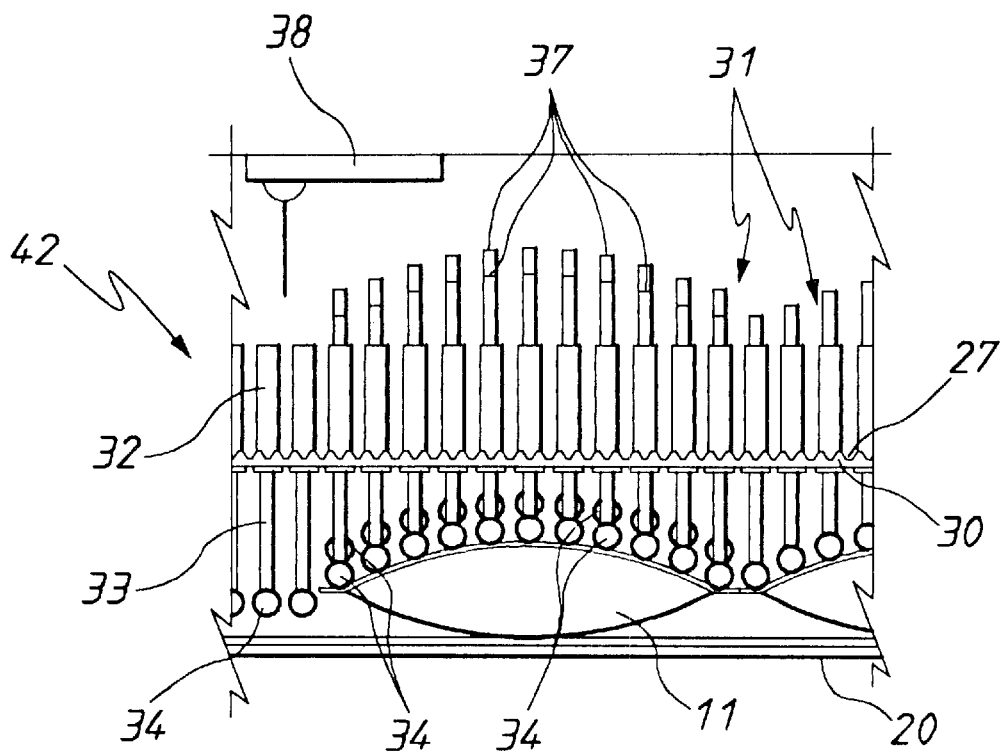
FIG. 6 is a schematic side elevation of a portion of the machine of FIG. 1 as modified in accordance with FIG. 3.
Figure 7:
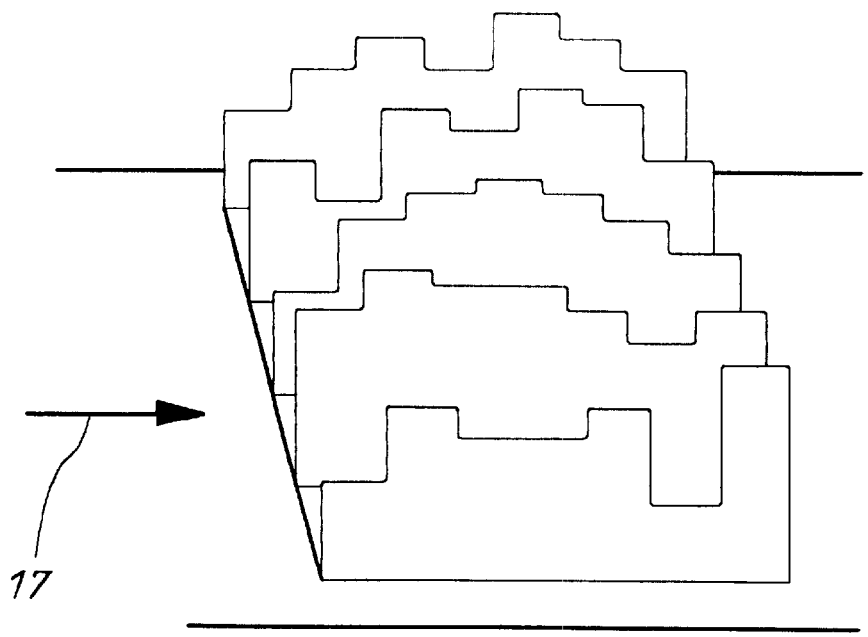
FIG. 7 is a schematic graph associated with the machine portion of FIG. 6.

In the embodiment of FIGS. 3, 6 and 7 the probes 31 are arranged in a plurality of rows 42. Accordingly each bag 11 is engaged by a plurality of probes 31 from each row 42. In this embodiment control software uses the input signals from the devices 38 to construct a before and after upper surface map of each bag 11. The before and after maps are used to establish whether a bag 11 leaks. Once detected a bag 11a is then ejected to the container 22.

In both the above described preferred embodiments, for each bag the "before" signal is generated by the lower device 38, while the "after" signals is generated by the upper device 38. If a bag 11 leaks the probe portions 33 will move towards the belt length 20 as they move from adjacent the lower detector 38 to the upper detector 38. This change in bag 11 configuration indicates a faulty bag 11a.

The claims defining the invention are as follows:

1. A probe assembly to detect faulty bags being transported in a predetermined direction from a first location to a second location, said assembly including:

a driven belt member forming a loop, the loop having a length to extend generally parallel to said direction between said first and second locations, which length is to move generally in unison with said bags between said first and second locations;

a plurality of probes supported on the belt member, each probe including a bag engaging portion moveably mounted on the belt member to engage one of the bags so as to be displaced thereby relative to the belt member, the probes being spaced so that each bag is engaged by a plurality of the probe members; and a detector to detect the displacement of the probe members and to generate a signal indicative of the displacement so that profile data in respect of each bag can be generated to aid in identifying faulty bags.

2. The assembly of claim 1, wherein said bag engaging portions are mounted on the belt for movement generally perpendicular thereto.

3. The assembly of claim 1, wherein the probes are arranged in a single row.

4. The assembly of claim 1, wherein the probes are arranged in a plurality of generally parallel co-extensive rows.

5. The assembly of claim 1, wherein said detector is a first and said assembly includes a second detector, the second detector being spaced downstream of the first detector in the direction of movement of the belt member.

6. The assembly of claim 1, wherein each probe includes a mounting member attached to the belt member, with the bag engaging portion being moveably mounted in its respective mounting member.

7. The assembly of claim 1, wherein said probe assembly further includes a probe compliance portion to engage the probes to urge the probe engaging portions towards the bags and conveyor.

8. The assembly of claim 7 wherein the compliance portion is a roller.

9. In combination, the probe assembly of claim 1 and a conveyor for the transportation of the bags, and wherein said length extends generally parallel to and is adjacent said conveyor between said first and second locations and moves generally in unison with said conveyor between said first and second locations.

10. A method of detecting bags having a leak, said method including:

moving the bags in a predetermined direction from a first location to a second location, engaging each bag with a plurality of probes, with displacement of the probes being determined by the bags, the probes being urged into contact with the bags;

moving the probes in the predetermined direction in unison with the bags when engaged therewith;

providing signals indicative of the displacement of the probes; and electronically comparing the signals associated with each bag at different times to detect a change in bag configuration and therefore determine whether the bag has a leak.

11. The method of claim 10, wherein the probes are moved in a direction generally perpendicular to the direction of movement of the bags, when the probes are moving into contact with the bags.

* * * * *